(12) United States Patent
Kaneko

(10) Patent No.: US 7,739,111 B2
(45) Date of Patent: Jun. 15, 2010

(54) PATTERN MATCHING METHOD AND APPARATUS AND SPEECH INFORMATION RETRIEVAL SYSTEM

(75) Inventor: Kazue Kaneko, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 739 days.

(21) Appl. No.: 11/463,332

(22) Filed: Aug. 9, 2006

(65) Prior Publication Data

US 2007/0038447 A1 Feb. 15, 2007

(30) Foreign Application Priority Data

Aug. 11, 2005 (JP) ............................. 2005-233337

(51) Int. Cl.
*G10L 11/00* (2006.01)
*G10L 15/00* (2006.01)
*G10L 15/06* (2006.01)

(52) U.S. Cl. ..................... 704/241; 704/202; 704/231; 704/238; 704/242; 704/245

(58) Field of Classification Search ............. 704/202, 704/231, 241, 245, 238, 242
See application file for complete search history.

(56) References Cited

U.S. PATENT DOCUMENTS

| 4,467,437 | A | * | 8/1984 | Tsuruta et al. | 704/241 |
| 4,559,604 | A | * | 12/1985 | Ichikawa et al. | 704/236 |
| 4,570,232 | A | * | 2/1986 | Shikano | 704/241 |
| 5,121,465 | A | * | 6/1992 | Sakoe | 704/236 |
| 5,577,164 | A | * | 11/1996 | Kaneko et al. | 704/275 |
| 5,737,722 | A | * | 4/1998 | Kopp et al. | 704/241 |
| 5,907,825 | A | * | 5/1999 | Tzirkel-Hancock | 704/243 |
| 5,960,395 | A | * | 9/1999 | Tzirkel-Hancock | 704/241 |
| 6,226,610 | B1 | * | 5/2001 | Keiller et al. | 704/241 |
| 6,374,218 | B2 | * | 4/2002 | Kimura et al. | 704/251 |
| 7,062,435 | B2 | * | 6/2006 | Tzirkel-Hancock et al. | 704/241 |
| 2003/0065510 | A1 | * | 4/2003 | Sato | 704/239 |

FOREIGN PATENT DOCUMENTS

JP 11-282488 10/1999

OTHER PUBLICATIONS

H. Sakoe, "Two-Level DP-Matching-A Dynamic Programming-Based Pattern Matching Algorithm for Connected Word Recognition," IEEE Transactions on Acoustics, Speech, and Signal Processing, vol. ASSP-27, pp. 588-595, Dec. 1979.*

H. Sakoe and S. Chiba, "Dynamic programming algorithm optimization for spoken word recognition," IEEE Trans. Acoust., Speech, Signal Processing, vol. ASSP-26, No. 1, pp. 43-49, 1978.*

(Continued)

*Primary Examiner*—David R Hudspeth
*Assistant Examiner*—Edgar Guerra-Erazo
(74) *Attorney, Agent, or Firm*—Cowan, Liebowitz & Latman, P.C.

(57) ABSTRACT

A pattern matching method for matching between a first symbol sequence and a second symbol sequence which is shorter than the first symbol sequence is provided. The method includes the steps of performing DP matching between the first and second symbol sequences to create a matrix of the DP matching transition, detecting the maximum length of lengths of consecutive correct answers based on the matrix of the DP matching transition, and calculating similarity based on the maximum length.

3 Claims, 15 Drawing Sheets

OTHER PUBLICATIONS

H. Sakoe and S. Chiba, "Dynamic programming algorithm optimization for spoken word recognition," IEEE Trans. Acoust.,Speech, Signal Processing, vol. ASSP-26, No. 1, pp. 43-49, 1978.*

Silverman et al., "The Application of dynamic programming to connected speech recognition," IEEE Acoust. Speech Signal Processing Mag., pp. 7-41, Jul. 1990.*

* cited by examiner

FIG. 5A

| i | (0) | n(1) | e(2) | k(3) | [f cor del sub ins]stat |
|---|---|---|---|---|---|
| o(8) | [-24 0 0 0 0 8] | [-21 1 0 0 0 7] | [-18 2 0 0 0 6] | [-15 3 0 0 0 5] | [-12 4 0 0 4]C |
| k(7) | [-21 0 0 0 0 7] | [-18 1 0 0 0 6] | [-15 2 0 0 0 5] | [-12 3 0 0 4]C | [-15 3 1 0 4]D |
| e(6) | [-18 0 0 0 0 6] | [-15 1 0 0 0 5] | [-12 2 0 0 4]C | [-15 2 1 0 4]D | [-18 2 2 0 4]] |
| n(5) | [-15 0 0 0 0 5] | [-12 1 0 0 4]C | [-15 1 1 0 4]D | [-18 1 2 0 4]] | [-15 2 2 0 3]] |
| o(4) | [-12 0 0 0 0 4] | [-13 0 0 1 3]] | [-14 0 0 2 2]] | [-15 1 2 0 3]] | [-12 2 2 0 2]C |
| r(3) | [-9 0 0 0 0 3]] | [-10 0 0 1 2]] | [-11 0 0 2 1]] | [-12 1 2 0 2]] | [-13 1 2 1 1]] |
| u(2) | [-6 0 0 0 0 2]] | [-7 0 0 1 1]] | [-8 0 0 2 0]S | [-9 1 2 0 1]] | [-10 1 2 1 0]S |
| k(1) | [-3 0 0 0 0 1]] | [-4 0 0 1 0]S | [-9 0 2 0 1]] | [-6 1 2 0 0]C | [-9 1 3 0 0]D |
| (0) | [ 0 0 0 0 0 0]] | [-3 0 1 0 0]D | [-6 0 2 0 0]D | [-9 0 3 0 0]D | [-12 0 4 0 0]D |

FIG. 5B

| | (0) | n(1) | e(2) | k(3) | o(4) j |
|---|---|---|---|---|---|
| | | | | [f cor del sub ins]stat | |
| i(12) | [-36 0 0 0 12 ] | [-33 1 0 0 11 ] | [-30 2 0 0 10 ] | [-27 3 0 0 9 ] | [-24 4 0 0 8 ] |
| r(11) | [-33 0 0 0 11 ] | [-30 1 0 0 10 ] | [-27 2 0 0 9 ] | [-24 3 0 0 8 ] | [-21 4 0 0 7 ] |
| o(10) | [-30 0 0 0 10 ] | [-27 1 0 0 9 ] | [-24 2 0 0 8 ] | [-21 3 0 0 7 ] | [-18 4 0 0 6 ]C |
| r(9) | [-27 0 0 0 9 ] | [-24 1 0 0 8 ] | [-21 2 0 0 7 ] | [-18 3 0 0 6 ] | [-15 4 0 0 5 ] |
| o(8) | [-24 0 0 0 8 ] | [-21 1 0 0 7 ] | [-18 2 0 0 6 ] | [-15 3 0 0 5 ] | [-12 4 0 0 4 ]C |
| k(7) | [-21 0 0 0 7 ] | [-18 1 0 0 6 ] | [-15 2 0 0 5 ] | [-12 3 0 0 4 ]C | [-15 3 1 0 4 ]D |
| X(6) | [-18 0 0 0 6 ] | [-15 1 0 0 5 ] | [-12 2 0 0 4 ] | [-13 2 0 1 3 ] | [-14 2 0 2 2 ] |
| e(5) | [-15 0 0 0 5 ] | [-12 1 0 0 4 ] | [-9 2 0 0 3 ]C | [-10 2 0 1 2 ] | [-11 2 0 2 1 ] |
| n(4) | [-12 0 0 0 4 ] | [-9 1 0 0 3 ] | [-6 2 0 0 2 ] | [-7 2 0 1 1 ] | [-8 2 0 2 0 ]S |
| X(3) | [-9 0 0 0 3 ] | [-6 1 0 0 2 ] | [-3 2 0 0 1 ] | [-4 2 0 1 0 ]S | [-9 2 2 0 1 ] |
| e(2) | [-6 0 0 0 2 ] | [-3 1 0 0 1 ] | [ 0 2 0 0 0 ]C | [-3 2 1 0 0 ]D | [-6 2 2 0 0 ]D |
| n(1) | [-3 0 0 0 1 ] | [ 0 1 0 0 0 ]C | [-3 1 1 0 0 ]D | [-6 1 2 0 0 ]D | [-9 1 3 0 0 ]D |
| (0) | [ 0 0 0 0 0 ] | [-3 0 1 0 0 ]D | [-6 0 2 0 0 ]D | [-9 0 3 0 0 ]D | [-12 0 4 0 0 ]D |

FIG. 7

|   | n | e | k | o |
|---|---|---|---|---|
| o | [-15 0 0 0 5] | [-12 1 0 0 4] | [-9 2 0 0 3]D | [-6 3 0 0 2] | [-3 4 0 0 1]C |
| k | [-12 0 0 0 4] | [-9 1 0 0 3] | [-6 2 0 0 2] | [-3 3 0 0 1] | [-4 3 0 1 0]S |
| k | [-9 0 0 0 3] | [-6 1 0 0 2] | [-3 2 0 0 1] | [0 3 0 0 0]C | [-3 3 1 0 0]D |
| e | [-6 0 0 0 2] | [-3 1 0 0 1] | [0 2 0 0 0]C | [-3 2 1 0 0]D | [-6 2 2 0 0]D |
| n | [-3 0 0 0 1] | [0 1 0 0 0]C | [-3 1 1 0 0]D | [-6 1 2 0 0]D | [-9 1 3 0 0]D |
|   | [0 0 0 0 0] | [-3 0 1 0 0]D | [-6 0 2 0 0]D | [-9 0 3 0 0]D | [-12 0 4 0 0]D | s = "nekko"
t = "neko"

del = 0
sub = 0
ins = 1
pc = 2
s_len = 4
PCor = (2-0-0)/4 = 0.5

FIG. 8

|   | | n | e | k | o |
|---|---|---|---|---|---|
| o | [-15 0 0 0 5] | [-12 1 0 0 4] | [-9 2 0 0 3] | [-6 3 0 0 2] | [-3 4 0 0 1]C |
| o | [-12 0 0 0 4] | [-9 1 0 0 3] | [-6 2 0 0 2] | [-3 3 0 0 1]- | [ 0 4 0 0 0]C |
| k | [-9 0 0 0 3] | [-6 1 0 0 2] | [-3 2 0 0 1]- | [ 0 3 0 0 0]C | [-3 3 1 0 0]D |
| e | [-6 0 0 0 2] | [-3 1 0 0 1]- | [ 0 2 0 0 0]C | [-3 2 1 0 0]D | [-6 2 2 0 0]D |
| n | [-3 0 0 0 1]- | [ 0 1 0 0 0]C | [-3 1 1 0 0]D | [-6 1 2 0 0]D | [-9 1 3 0 0]D |
|   | [ 0 0 0 0 0]i | [-3 0 1 0 0]D | [-6 0 2 0 0]D | [-9 0 3 0 0]D | [-12 0 4 0 0]D | s = "nekoo"
t = "neko"

del = 0
sub = 0
ins = 1
s_len = 4
pc = 3
PCor = (3-0-0)/4 = 0.75

PATTERN MATCHING METHOD AND APPARATUS AND SPEECH INFORMATION RETRIEVAL SYSTEM

BACKGROUND OF THE INVENTION

1. Field of the Invention

The present invention relates to a pattern matching method and apparatus for performing Dynamic Programming (DP) matching of symbol sequences and to a speech information retrieval system.

2. Description of the Related Art

DP matching is well known as pattern matching used in the fields of information retrieval and speech recognition (for example, see Japanese Patent Application Laid-Open No. 11-282488). This is an approach for calculating the level of similarity between two symbol sequences using, as a measure of penalty, incorrectness (under operations of insertion, deletion, substitution, etc.) other than a coincidence or correct answer as a penalty.

The DP matching method mentioned above is used for calculating similarity between two symbol sequences to be compared. Specifically, if the two symbol sequences have different respective lengths and one of these symbol sequences contains another symbol sequence, the similarity is calculated to be low because it is calculated as having an insertion error. For example, if "aaabbb" and "aaa" are matched to each other, a penalty may be added taking into account the fact that there is an insertion of "bbb." Thus, matching using the DP method is not suitable in cases requiring a determination of whether or not "aaa" is contained in "aaabbb."

In order to perform matching between these symbol subsequences, a method in which no insertion error is simply taken into account is a possible approach. In this case, the similarity may however be the same both when there is a string of matching symbol sequences as a symbol subsequence, and when the symbol sequences appear apart from each other. For example, the same score (similarity) is obtained both in considering whether "ab" is contained in "acccb" and in determining whether "ab" is contained in "abccc."

To deal with this problem, in matching between symbol subsequences using the DP matching, a method for repetitively calculating while shifting the matching range is known. This method has a problem in that it requires a significant amount of calculation.

SUMMARY OF THE INVENTION

In view of the above problems in the conventional art, the present invention has an object to provide pattern matching of the symbol subsequences according to DP matching with a small amount of calculation.

According to one aspect of the present invention, a pattern matching method for matching between a first symbol sequence and a second symbol sequence which is shorter than the first symbol sequence is provided. The method includes the steps of performing DP matching between the first and second symbol sequences to create a matrix of the DP matching transition, detecting the maximum length of lengths of consecutive correct answers based on the matrix of the DP matching transition, and calculating similarity based on the maximum length.

Further features of the present invention will become apparent from the following description of exemplary embodiments with reference to the attached drawings.

BRIEF DESCRIPTION OF THE DRAWINGS

FIGS. 5A and 5B are diagrams showing examples of DP matching transition in an embodiment;

FIG. 7 is a diagram showing a calculated example of similarity of symbol subsequences in an embodiment;

FIG. 8 is a diagram showing a calculated example of similarity of symbol subsequences in a variation example;

DESCRIPTION OF THE EMBODIMENTS (System Outline)

Figure 1:
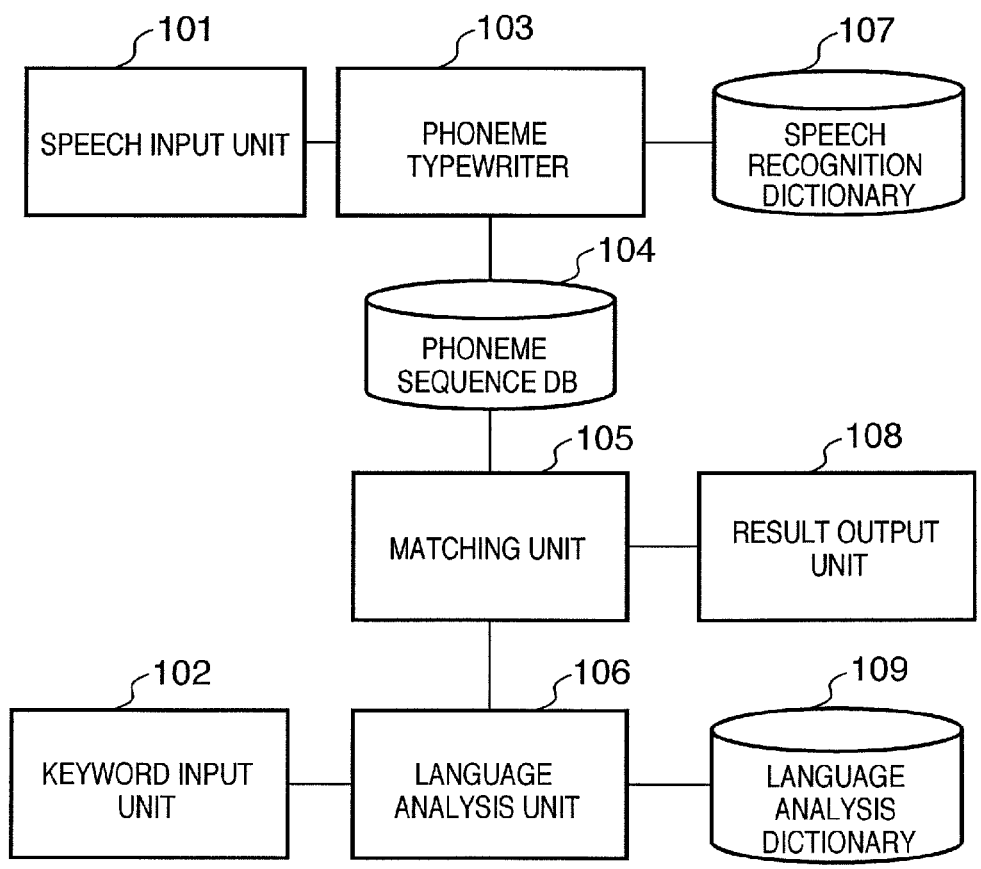
FIG. 1 is a block diagram showing a configuration of a speech information retrieval system in an embodiment of the present invention.

FIG. 1 is a block diagram showing a configuration of a speech information retrieval system in accordance with the present embodiment. In FIG. 1, reference numeral 101 denotes a speech input unit, reference numeral 102 denotes a keyword input unit, reference numeral 103 denotes a phonetic typewriter for recognizing speech to output phoneme sequences, and reference numeral 104 denotes a phoneme sequence database (DB) for storing phoneme sequences. In addition, reference numeral 105 denotes a matching unit for matching between a retrieval keyword converted into phoneme sequences and phoneme sequences in the phoneme sequence DB 104, and reference numeral 106 denotes a language analysis unit for converting retrieval keywords inputted with characters into phoneme sequences. Furthermore, reference numeral 107 denotes a speech recognition dictionary, reference numeral 108 denotes a result output unit for outputting matching results, and reference numeral 109 denotes a language analysis dictionary.

Figure 2:
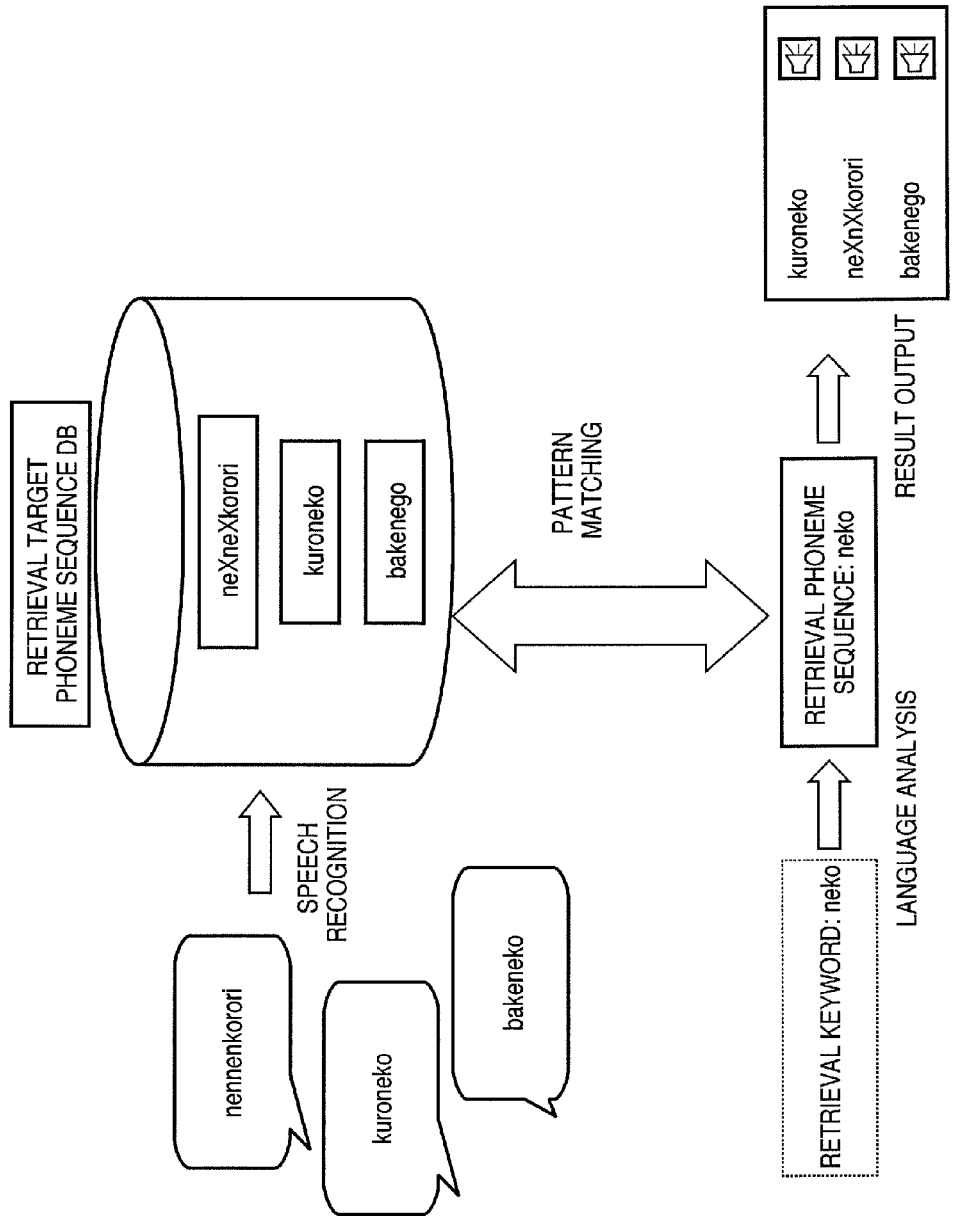
FIG. 2 is a diagram showing an outline of operation of a speech information retrieval system in an embodiment.

FIG. 2 is a diagram showing an outline of operation in a speech information retrieval system in accordance with the present embodiment. First speeches such as "nennenkorori," "kuroneko," and "bakeneko" are entered from the speech input unit 101. Next, speech recognition is performed with the phonetic typewriter 103 for each speech to convert into phoneme sequences such as 'neXneXkorori,' 'kuroneko,' or 'bakenego,' which are in advance stored in the phoneme sequence DB 104 as a retrieval target. Here, a speech recognition result of "bakeneko" is assumed to be misunderstood as "bakenego."

In the case of performing retrieval, a keyword is entered with characters through the keyword input unit 102. For example, "neko" is entered. The entered keyword is then analyzed by the language analysis unit 106 to convert into a retrieval phoneme sequence 'neko.' Matching is then performed between the retrieval phoneme sequence 'neko' and the phoneme sequence DB 104 as the retrieval target, to output the phoneme sequences combined with speech data for confirmation through the result output unit 108 as a result rated by the similarity.

(DP Matching)

As mentioned above, in the present embodiment the retrieval result is output based on the calculated similarity according to the DP matching. The DP matching in the present embodiment will now be described in detail below.

First, a formula of general DP matching is shown. Note that in the following a retrieval target side character string and a reference side character string in the matching are denoted as s and t respectively, and reference character si denotes an i-th character in the retrieval target side character string, and reference character tj denotes a j-th character in the reference side character string.

$$f(0,0)=0$$

$$f(i,j)=\min\{f(i-1,j)+1, f(i,j-1)+1, f(i-1,j-1)+d(si, tj)\}$$

where if si=tj, then d=0 if si≠tj, then d=1

In accordance with such a general formula, though any penalty in the case of not correct answer is calculated as 1, in the present embodiment it is characterized that types of penalty are grouped into 'insertion,' 'substitution,' and 'deletion,' and calculation is performed by imparting respective different penalties.

Next, a formula of OP matching in the present embodiment is shown as in the following.

$$f(0,0)=0$$

$$f(i,0)=-3*i$$

$$f(0,j)=-3*j$$

$$f(i,j)=\max\{f(i-1,j)-3, f(i,j-1)-3, f(i-1,j-1)-d(si, tj)\}$$

where if si=tj, then d=0 if si≠tj, then d=4

In addition, a state, stat, is determined as shown in the following depending on which is selected as max by f (i, j).

$$\text{stat}(i, 0)=I$$

$$\text{stat}(0, j)=D$$

$$\text{stat}(i, j)=C \ldots \text{if } f(i-1, j-1)-0(si=tj) \text{ is selected}$$

$$\text{stat}(i, j)=I \ldots \text{if } f(i-1, j)-3 \text{ is selected}$$

$$\text{stat}(i, j)=S \ldots \text{if } f(i-1, j-1)-4 \ (si\neq tj) \text{ is selected}$$

$$\text{stat}(i, j)=D \ldots \text{if } f(i, j-1)-3 \text{ is selected}$$

As shown above, the DP matching of the present embodiment calculates the value of f (i, j), determines the matching state (stat) of the location in the transition path, and the number of states is added to. Here, as shown in the above formula, the matching state, stat, is determined to be C if the matching corresponds to a correct answer, to be D if there is a deletion error, to be S if there is a substitution error, and to be I if there is a insertion error.

(Similarity Calculation)

The similarity calculation based on the DP matching in the present embodiment will now be described in the following.

First, the similarity calculation of the DP matching of all symbol sequences is performed as in the following using the length of reference side character string t ("neko" in the example of FIG. 2) t_len, the total number of deletion error del, the total number of substitution error sub, and the total number of insertion error ins.

$$\text{Acc}=(t\_len-del-sub-ins)/t\_len \qquad (1)$$

$$\text{Cor}=(t\_len-sub-del)/t\_len \qquad (2)$$

Here, reference character Acc denotes a precision ratio of similarity between the retrieval target side character string s and the reference side character string t, and reference character Cor denotes a recall ratio of the retrieval target side character string s in the reference side character string t. In the present invention, the DP matching of all symbol sequences employs this Acc as the similarity.

Figure 3A:
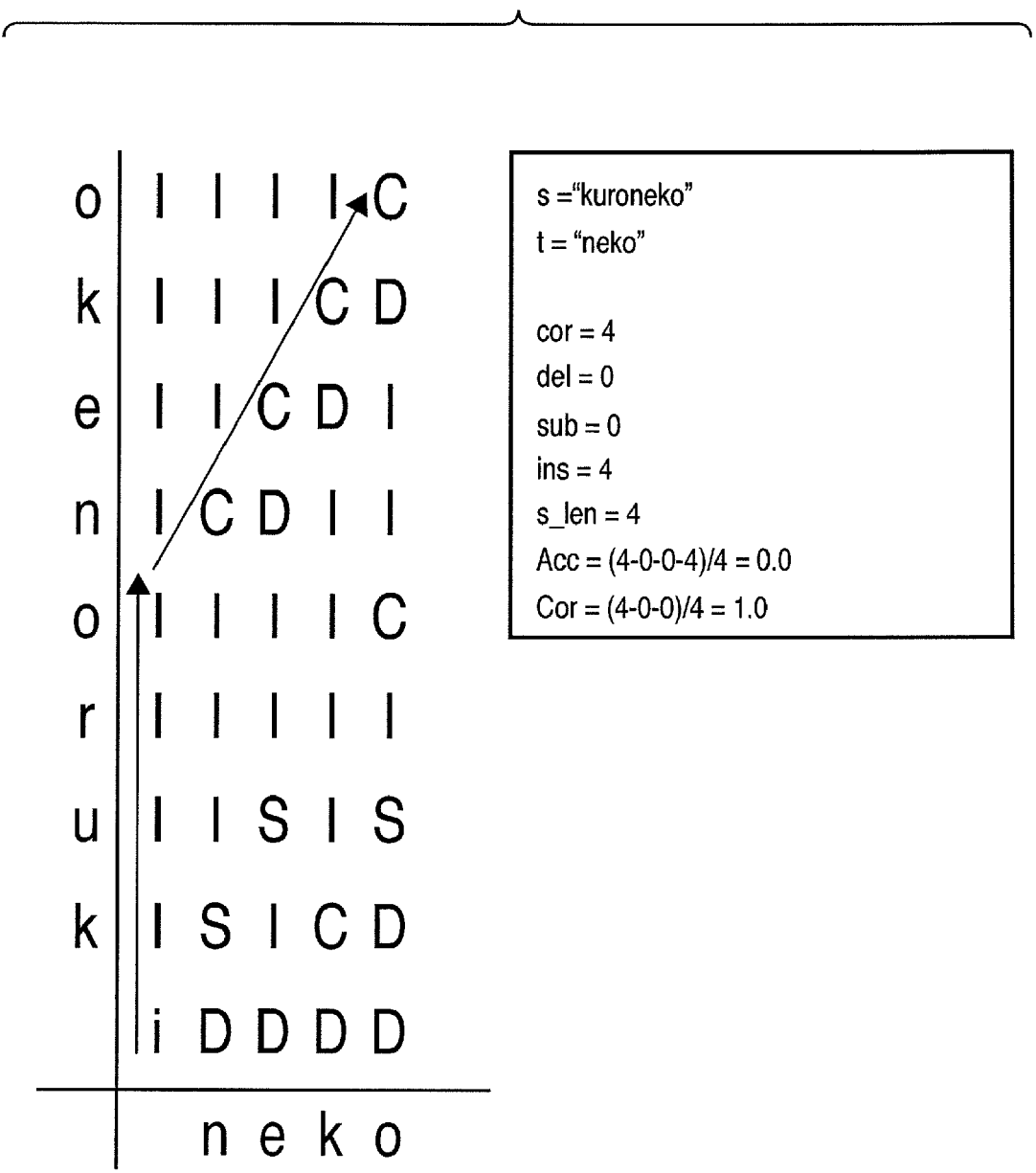
FIGS. 3A, 3B and 3C are diagrams showing calculated examples of similarity of all character strings according to DP matching.
Figure 3B:
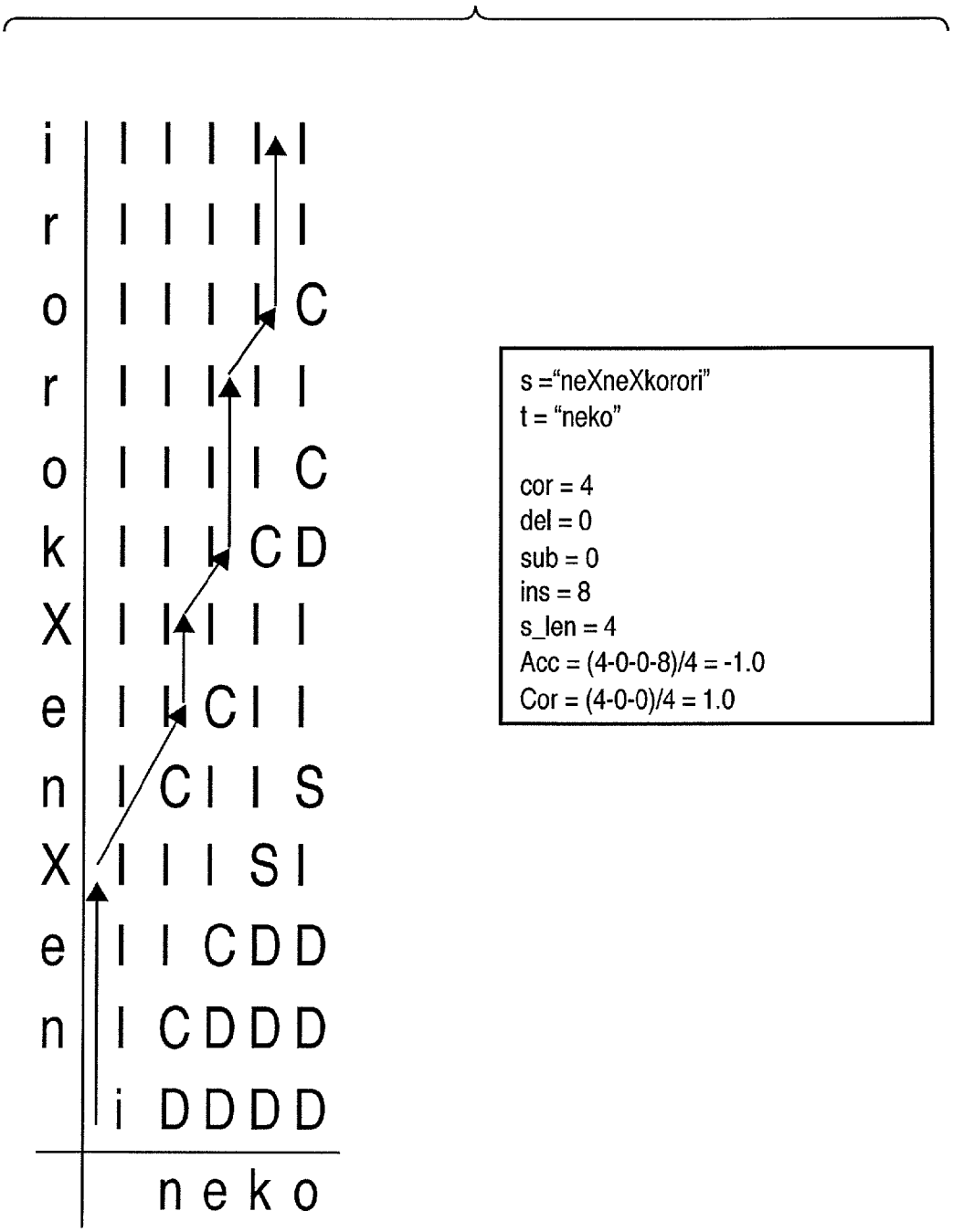
Figure 3C:
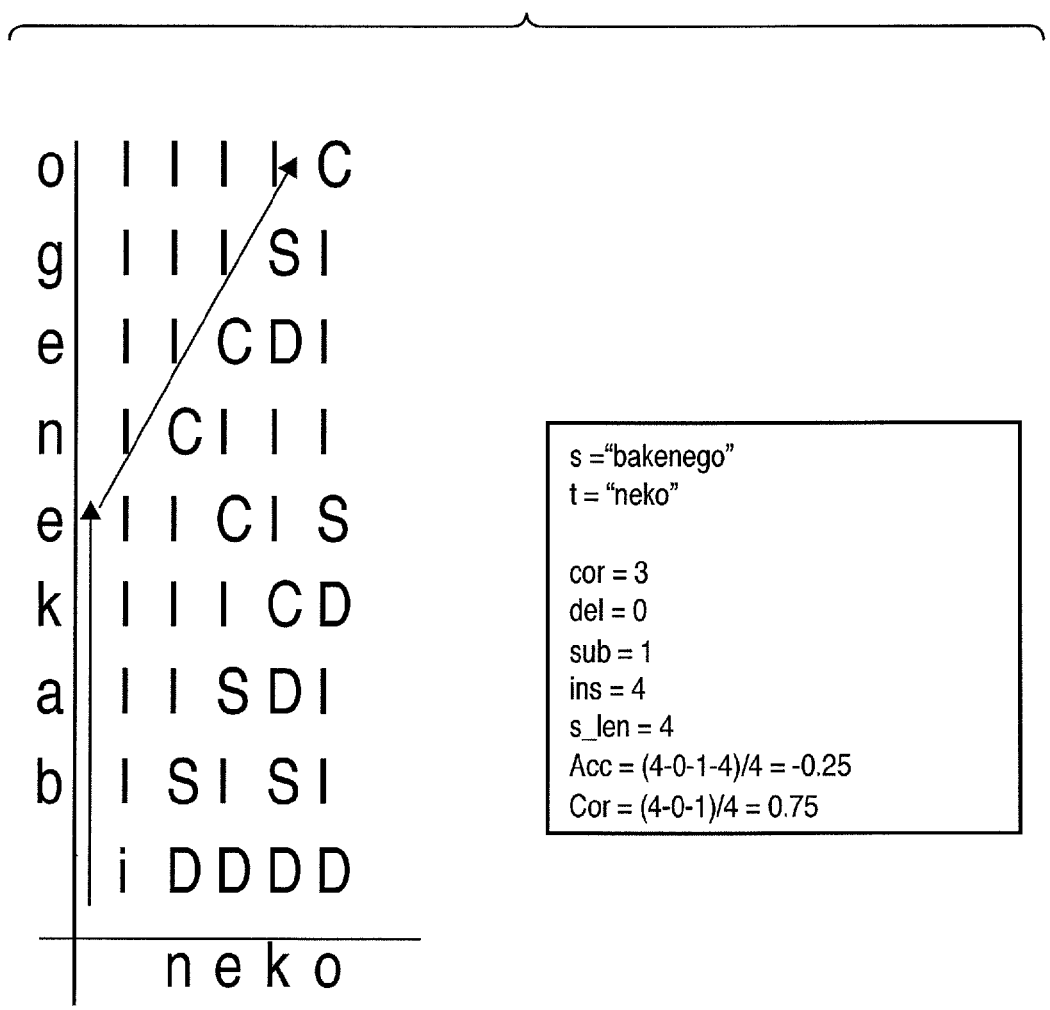

In FIG. 3A to FIG. 3C, calculated examples of the similarity Acc and the recall ratio Cor of the all symbol sequences are shown by performing the DP matching of the present embodiment. FIG. 3A, FIG. 3B, and FIG. 3C are matched examples between "neko" and "kuroneko," between "neko" and "neXneXkorori," and between "neko" and "bakenego" respectively. In the matrix in each figure of FIG. 3A, FIG. 3B, and FIG. 3C, the lateral shows "neko," and the vertical shows "kuroneko," "neXneXkorori," and "bakenego" respectively. In addition, reference characters i, C, D, S, and I in each of the sequences denote respective matching states. That is, reference character C is described if the matching corresponds to a correct answer, reference character D is described if there is a deletion error, reference character S is described if there is a substitution error, and reference character I is described if there is a insertion error. Moreover, reference character i in location (0, 0) denotes an initial state. Furthermore, an arrow over the matrix shows a transition of calculation which has arrived to the last.

In the case of FIG. 3A, the total number of Cs on the arrows cor is four, the total number of Ds on the arrows del is zero, the total number of Ss on the arrows sub is zero, and the total number of Is on the arrows ins is four. Therefore, according to the above mentioned formulas (1) and (2), the similarity Acc is 0.0 and the recall ratio Cor is 1.0. As a result, the value of Acc used in the matching of the all symbol sequences is found to be not suitable for the matching of the symbol subsequences in which the lengths of the symbol number to be compared are different. Therefore, focusing attention on Cor corresponding to the recall ratio, Cor in FIG. 3A is 1.0, Cor in FIG. 3B is 1.0, and Cor in FIG. 3C is 0.75, thus "neXneXkorori" which has an insertion within "neko" has the same numeric value as "kuroneko" which has no insertion. Therefore, the recall ratio Cor is also not suitable as the calculation formula of matching between the symbol subsequences.

Therefore, in the present embodiment, the recall ratio PCor is applied to matching of the symbol subsequences by changing the calculation formula of the recall ratio Cor used for matching of symbol subsequences as in the following.

$$\text{PCor}=(pc-del-sub)/t\_len \qquad (3)$$

Where reference character pc denotes the maximum length of consecutive correct answers.

(Calculation of the Maximum Length of Consecutive Correct Answers)

The process for calculating the maximum length PC of consecutive correct answers in the formula (3) will now be described below using a flow chart of FIG. 4. In other words, the process is to obtain the maximum length of consecutive correct answers by tracing back the DP matching result from the last node.

First in step S601, a terminal node is selected as the terminal of consecutive correct answers. In selecting the terminal node, midway process values of the DP matching transition are used.

The process for selecting the terminal node will now be described in detail with reference to FIG. 5A and FIG. 5B. FIG. 5A and FIG. 5B show the DP matching transitions according to "neko" and "kuroneko," and according to "neko" and "neXneXkorori" respectively. Both figures show the content to be [f (evaluated value) cor (accumulated correct answers) del (accumulated deletions) sub (accumulated substitutions) ins (accumulated insertions)] stat (state) using midway process of the transition as nodes. Moreover, matrixes in FIG. 5A and FIG. 5B represent the range of i=0 to s_len and j=0 to t_len.

In transition diagrams of FIG. 5A and FIG. 5B, first i=s_len and j=t_len are assumed, and if the cor of the node [i−1][j] is smaller than the cor of the node [i][j], then the node [i][j] is defined as a terminal node. If otherwise, then reference number i is decremented by one to search the terminal node. In FIG. 5A, the node [8][4] will be the terminal node, and in FIG. 5B the immediately preceding node [8][4] of the node where the cor value changes from "4" to "3" will be the terminal node.

As described above, if the correct answer terminal node is selected in step S601, then this node is used as an attention node to search correct answer nodes subsequently. To this end, first in step S602, the counter c which shows the length of consecutive correct answers and the maximum value cmax of the lengths of consecutive correct answers are initialized to zero.

Next in step S603, it is determined whether the node search process is finished or not at the current attention node. Here, if any correct answer terminal node is not found or if the attention node corresponds to i==0 or j==0, the node search is finished. If the node search is finished, then in step S610 the counter c is compared with the maximum value cmax. If the counter c is larger than the maximum value cmax, then in step S611 the operation of cmax=c is performed, and if otherwise, then the process is finished without being processed. The maximum value cmax will be the length pc of consecutive correct answers.

If the node search is still continued in step S603, then in step S604 it is determined whether the node state (stat) is C or not. If the stat is C, then in step S609 the counter c is incremented to proceed to step S608.

On the other hand, if the stat is a state other than C in step S604, the process proceeds to step S605. In step S605, the counter c is compared with the maximum value cmax. If the counter c is larger than the maximum value cmax, then in step S606 the operation cmax=c is performed to proceed to step S607. If otherwise, the process proceeds to step S607 without being processed, and proceeds to step S608 after resetting to c=0.

In step S608, the selection of a return node, which is returned by one node from the attention node, is performed. An algorithm for selecting the return node follows the order of (1) to (5) as follows:

(1) If the stat of the node [i][j] is C and the stat of the node [i−i][j−1] is C, and if the cor of the node [i][j] is larger than that of the node [i−1][j−1] by one,
→then node [i−1][j−1] is defined as the return node.
(2) If the stat of the node [i][j] is C and the stat of the node [i−1][j−1] is C, and if the cor of the node [i][j] is same as the cor of the node [i−1][j−1],
→then the node of the node [i−1][j] and the node [i][j−1] which has the stat other than C, has the f larger than or equal to the f of the node [i][j], and has the maximum f is defined as the return node.
(3) If the stat of the node [i][j] is C and the stat of the node [i−1][j−1] is not C,
→then the node of the node [i][j−1], the node [i−1][j−1] and the node [i−i][j] which has the stat other than C, has the f larger than or equal to the f of the node [i][j], and has the maximum f is defined as the return node.
(4) If the stat of the node [i][j] is other than C,
→then the node of the node [i][j−1], the node [i−1][j−1] and the node [i−1][j] which has the f larger than or equal to the f of the node [i][j] and has the maximum f is defined as the return node.
(5) If there is no node corresponding to that mentioned above,
→then the node [i−1][j] is defined as the return node.

As described above, if the return node which is returned by one node is selected, then the process returns to step S603 with the return node being as an attention node, repeating the above mentioned process. Accordingly, in the examples shown in FIG. 5A and FIG. 5B for example, the process returns one node by one node from the terminal node along the path shown by underlining. FIG. 5A shows an example in which the process returns from the node [8][4] being the terminal node to the node [4][0] one node by one node through the nodes in which the stat is C, and FIG. 5B shows an example in which the process returns from the node [8][4] being the terminal node to the node [0][0] through the nodes also including the nodes in which the stat is other than C.

Figure 4:
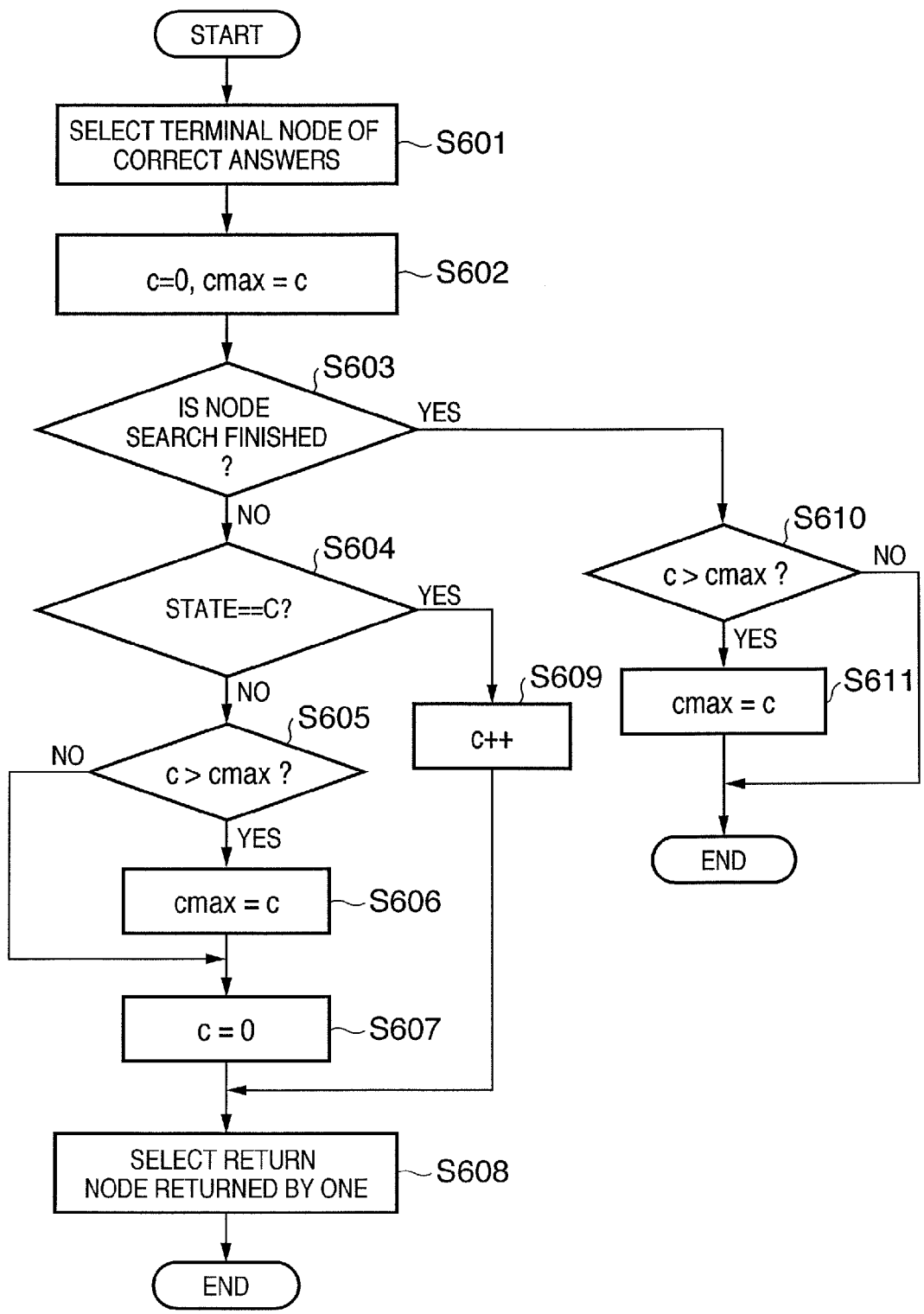
FIG. 4 is a flow chart showing a process for obtaining the maximum length of consecutive correct answers in an embodiment.

The maximum value cmax of lengths of consecutive correct answers which can be obtained by the process shown in the flow chart of FIG. 4 described above is namely the maximum length pc of consecutive correct answers in the formula (3).

(Calculated Examples of Similarity of Symbol Subsequences)

Figure 6A:
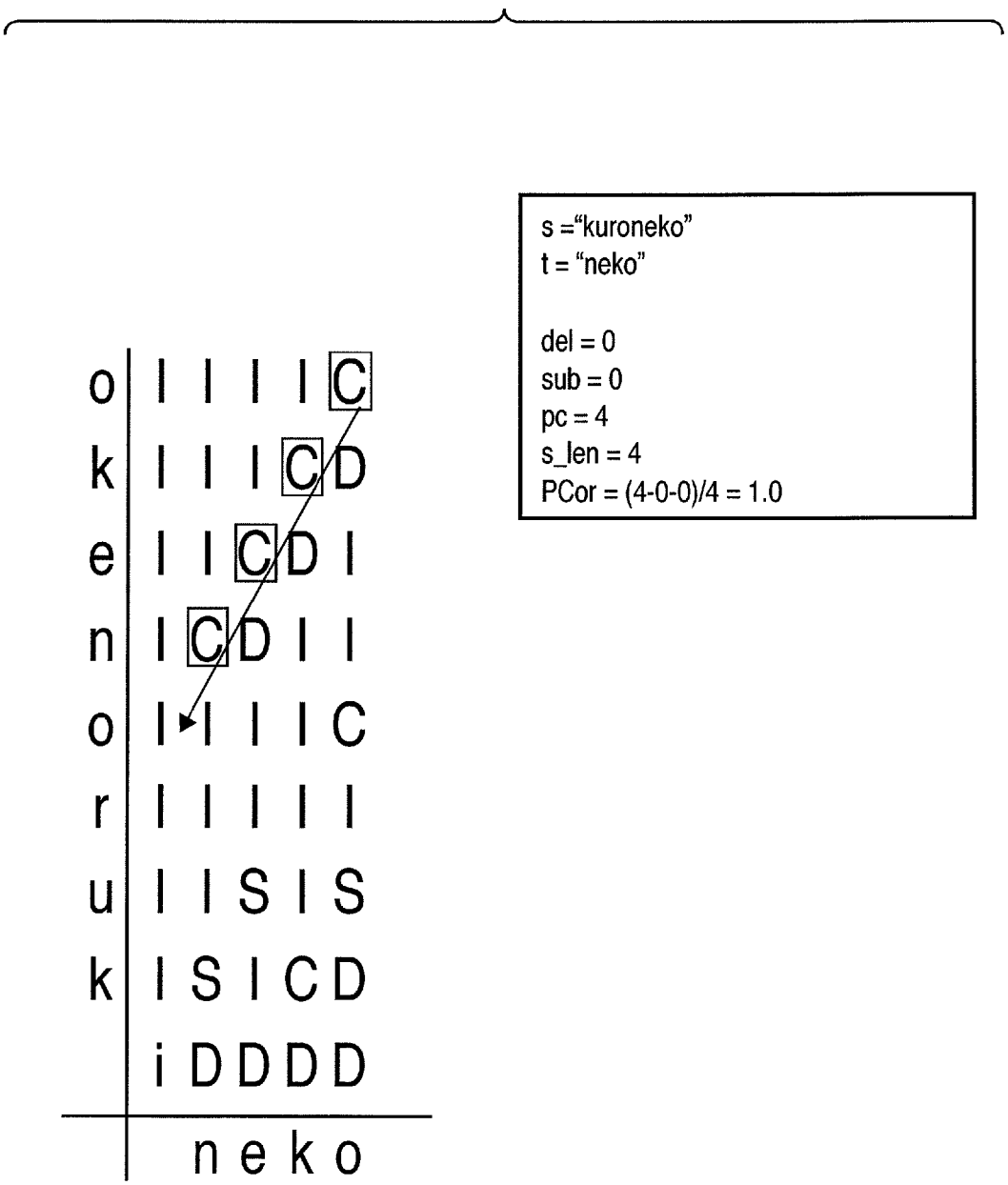
FIGS. 6A, 6B and 6C are diagrams showing calculated examples of similarity of symbol subsequences in an embodiment.
Figure 6B:
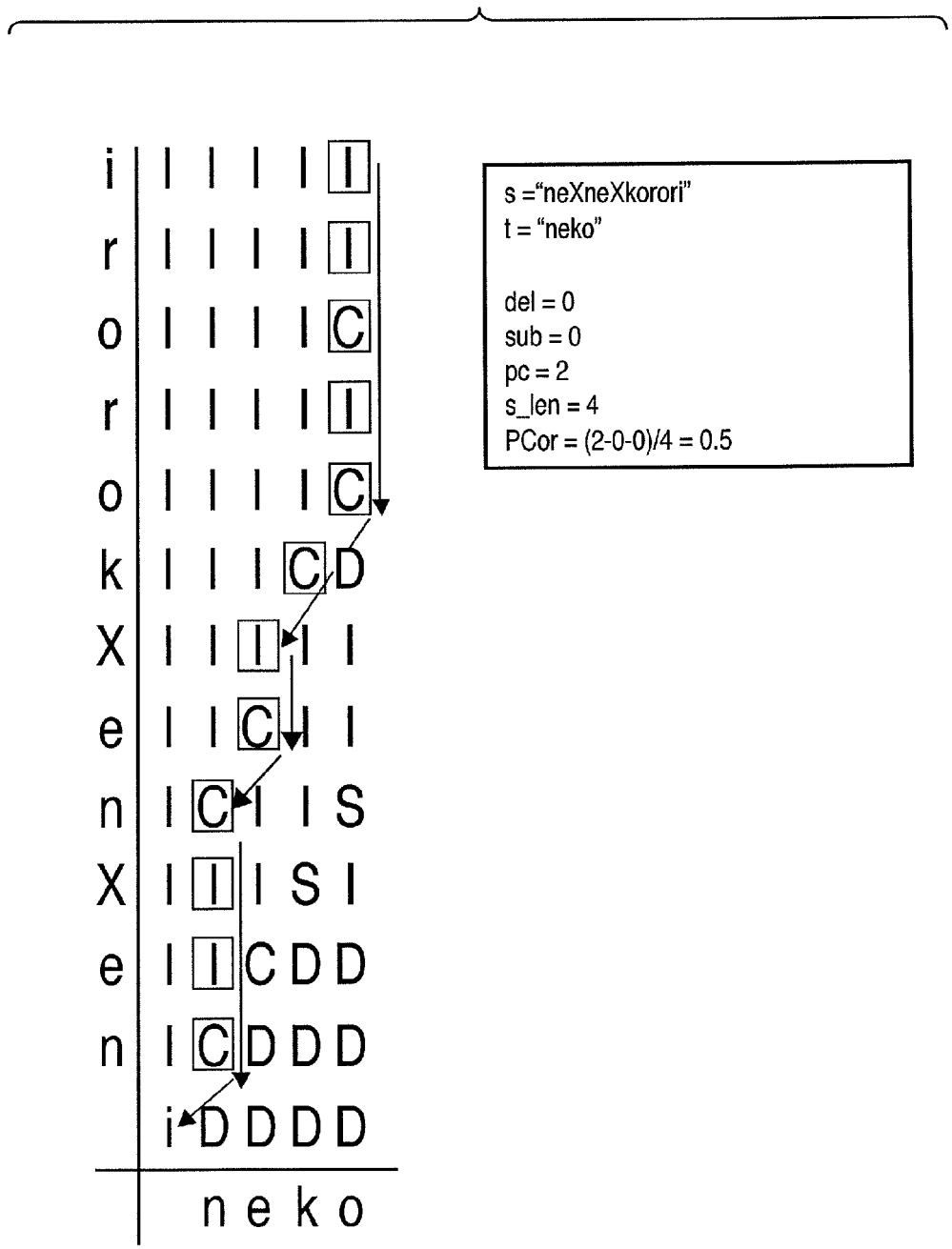
Figure 6C:
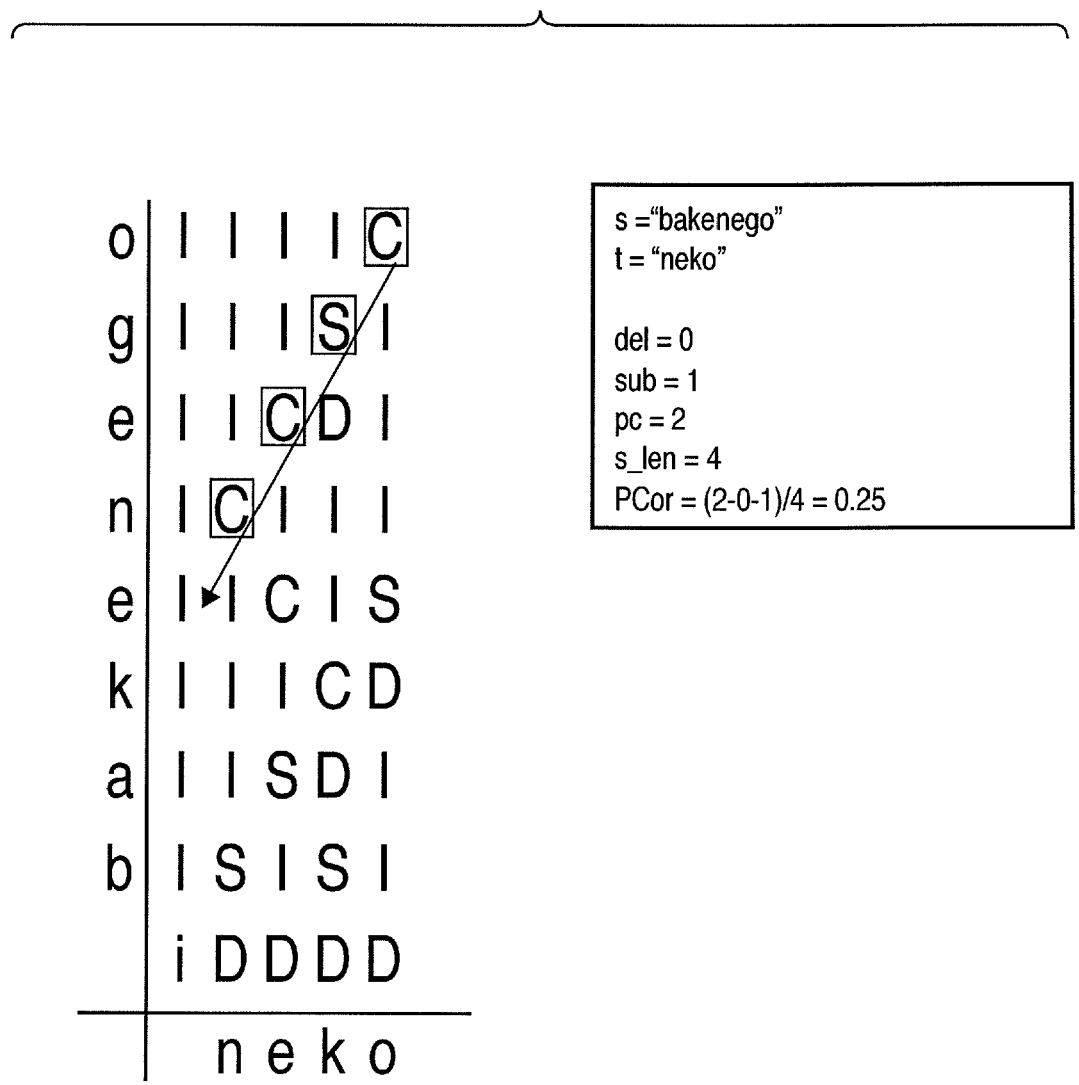

FIG. 6A to FIG. 6C are diagrams showing calculated examples of similarity of symbol subsequences based on the maximum length pc of consecutive correct answers which is obtained by the algorithm described in FIG. 4. FIG. 6A, FIG. 6B, and FIG. 6C show examples matched between "neko" and "kuroneko," between "neko" and "neXneXkorori," and between "neko" and "bakenego" respectively. In respective figures, the pc values of FIG. 6A, FIG. 6B, and FIG. 6C are obtained as "4," "2," and "2" respectively by counting the number of consecutive states Cs (pc) while returning from the terminal node in the arrow direction according to the matching of the present embodiment. As a result, similarities of respective character substrings PCor are "1.0," "0.5," and "0.25" according to the formula (3). Thus in other words, the similarity of the character substrings is found to be highest in the matching of FIG. 6A.

In addition, in the matching of the present embodiment, the counting loss of the number of consecutive states Cs may occur. In the example of matching between "neko" and "nekko" shown in FIG. 7 for example, the maximum length pc of the correct answers may be "2."

As described above, in the present embodiment, because the similarity of symbol subsequences can be calculated based on the matching results of once, the pattern matching of the symbol subsequences according to the DP matching can be achieved with a small amount of calculation, thereby improving the search speed.

VARIATION EXAMPLE 1

By having recorded as prev the node in which the midway f value in the DP matching of the present embodiment is passed on, the maximum length of consecutive states Cs may be obtained by tracing the prev. In such a matching, however, the counting loss of the number of consecutive states Cs may occur.

For example, an example of matching between "neko" and "nekoo" shown in FIG. 8 will now be described. In FIG. 8, arrows show DP matching transitions in the present variation example, and in the case of tracing the prev, the transitions are traced in the opposite direction of the arrows from the node [5][4]. In FIG. 8, the path which has matched up to "n," "e," "k" and "o" has not arrived at the last "o," and the path which has arrived at the last "o" is a transition which includes a state I at the midpoint. In this method in which the prev shown by this arrow is traced in the opposite direction, the maximum length of consecutive states Cs will be "2." When the matching of the present embodiment is performed, the search is performed along the path shown by the underline, and the maximum length of consecutive states Cs will be "3."

VARIATION EXAMPLE 2

The DP matching results are traced one by one from the first, and if the node in which the stat is C is detected, then respective reference numerals i and j are also incremented to count the number of the consecutive Cs in the right diagonal direction to obtain the maximum length.

Figure 9:
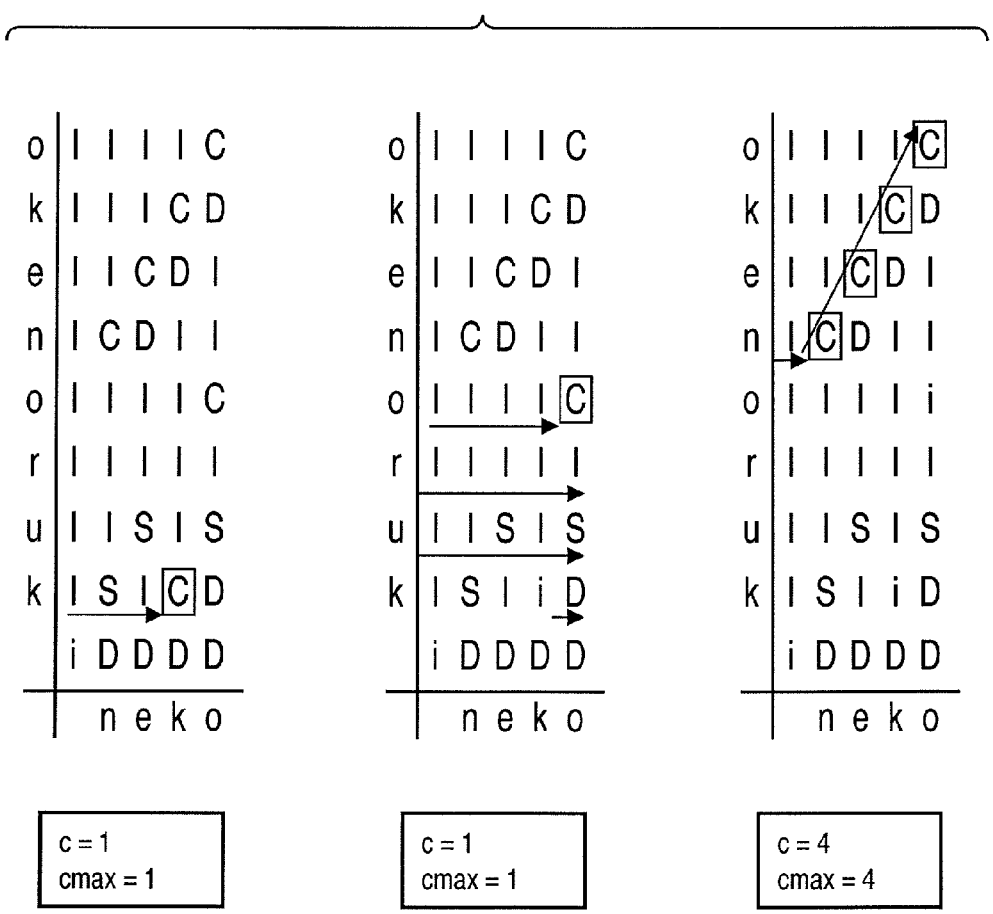
FIG. 9 are diagrams showing calculated examples of the maximum length of consecutive correct answers in a variation example.

In this case, in order to prevent the C counted once from counting again, the node counted once is shown as invalid by setting the stat to "i." In FIG. 9, the aspect of counting the state C according to the present variation example is shown.

Note that according to this method there is no counting loss of the number of the consecutive Cs, but there is a possibility that an amount of calculation may increase.

VARIATION EXAMPLE 3

If there are consecutive states Cs separated from others in the DP matching results, and if there is a substitution (S) or deletion (D) in between, then this can be neglected and the maximum length can be obtained by adding the lengths of consecutive Cs before and after this.

Figure 10:
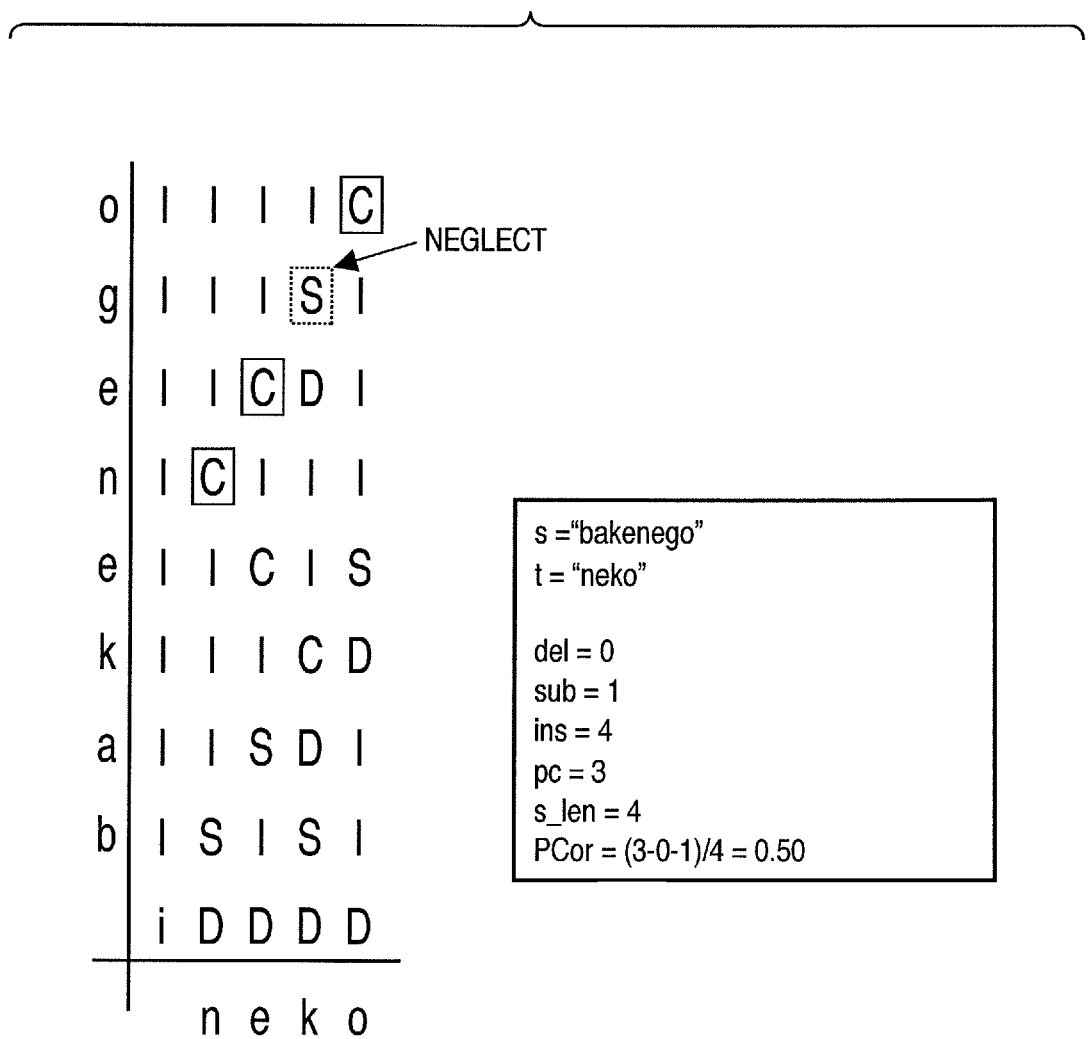
FIG. 10 is a diagram showing a calculated example of similarity of symbol subsequences in a variation example.

As the example of matching between "neko" and "bakenego" of FIG. 10, if there is the substitution of 'k' and 'g' between "neko" and "nego," the state S may be neglected. And pc=3 may be obtained by adding the length "1" of the matching of 'o' to the length "2" of the matching of 'ne.'

In addition, for the sequence of a substitution (S) or deletion (D) sandwiched between consecutive Cs, an acceptable upper limit of the number may be set.

VARIATION EXAMPLE 4

For the matching of symbol sequences in the present embodiment, it is effective to determine that even if there is not at all any matching between the symbols they are regarded to be substantially same by using an evaluation function in determining whether the symbols match or not.

VARIATION EXAMPLE 5

As the DP matching of the present embodiment, by performing the conventional type DP matching without discriminating between the insertion (I), the deletion (D) and the substitution (S), and using the maximum length pc of consecutive correct answers and the length (t_len) of the character string t, the similarity of symbol subsequences can be calculated according to the calculation formula as in the following.

$PCor = pc/t\_len$

VARIATION EXAMPLE 6

In the speech information retrieval system of the present embodiment, the form not only for handling phoneme sequences in the phoneme sequence DB 104 but also for adding speech to character data or image data as a memo may be provided. In this case, the phoneme sequences can be given to the system as the keywords, and the data such as characters or images linked with matched phoneme sequences can be presented as a search result. In addition, not only the search keywords can be specified with characters, but also resulting phoneme sequences of speech recognition of the speech spoken can be used as the search keywords.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-233337, filed Aug. 11, 2005, which is hereby incorporated by reference herein in its entirety.

What is claimed is:

1. A pattern matching method for matching between a first symbol sequence of m symbols and a second symbol sequence of n symbols, the method comprising the steps of:
   for each i ($1<=i<=m$) and j ($1<=j<=n$), comparing i-th symbol s(i) of the first symbol sequence with j-th symbol t(j) of the second symbol sequence, and setting a state stat(i, j) which indicates a state of a node of i and j node(i, j) according to the comparison, wherein if s(i) matches to t(j), then node(i, j) is set to a value that indicates correct, otherwise node(i, j) is set to a value that indicates incorrect;
   for each a, b, and c ($1<=a<a+c<=m$, $1<=b<b+c<=n$), counting the maximum number of consecutive nodes pc in which all states of stat(a, b), stat(a+1, b+1), . . . , stat(a+c, b+c) indicate correct; and
   determining similarity of the first and second symbol sequences based on the maximum number pc.

2. A pattern matching apparatus for matching between a first symbol sequence of m symbols and a second symbol sequence of n symbols, the apparatus comprising:
   a comparison unit configured to compare, for each i ($1<=i<=m$) and j ($1<=j<=n$), an i-th symbol s(i) of the first symbol sequence with j-th symbol t(j) of the second symbol sequence, and to set a state stat(i, j) which indicates a state of a node of i and j node(i, j) according to the comparison, wherein if s(i) matches to t(j), then node(i, j) is set to a value that indicates correct, otherwise node (i, j) is set to a value that indicates incorrect;
   a counting unit configured to count, for each a, b, and c ($1<=a<a+c<=m$, $1<=b<b+c<=n$), the maximum number of consecutive nodes pc in which all states of stat(a, b), stat(a+1, b+1), stat(a+c, b+c) indicate correct; and
   a determination unit configured to determine similarity of the first and second symbol sequences based on the maximum number pc.

3. A computer-executable program stored on a computer-readable storage medium, said program comprising program code for causing a computer to execute a pattern matching method for matching between a first symbol sequence of m symbols and a second symbol sequence of n symbols, the method comprising the steps of:
   for each i ($1<=i<=m$) and j ($1<=j<=n$), comparing i-th symbol s(i) of the first symbol sequence with j-th symbol t(j) of the second symbol sequence, and setting a state stat(i, j) which indicates a state of a node of i and j node(i, j) according to the comparison, wherein if s(i) matches to t(j), then node(i, j) is set to a value that indicates correct, otherwise node(i, j) is set to a value that indicates incorrect;
   for each a, b, and c ($1<=a<a+c<=m$, $1<=b<b+c<=n$), counting the maximum number of consecutive nodes pc in which all states of stat(a, b), stat(a+1, b+1), . . . , stat(a+c, b+c) indicate correct; and
   determining similarity of the first and second symbol sequences based on the maximum number pc.

* * * * *